United States Patent
Mizon

(10) Patent No.: US 10,068,395 B2
(45) Date of Patent: Sep. 4, 2018

(54) ACCESS CONTROL SYSTEM

(75) Inventor: John Mizon, Cham (CH)

(73) Assignee: Inventio AG, Hergiswil NW (CH)

( * ) Notice: Subject to any disclaimer, the term of this patent is extended or adjusted under 35 U.S.C. 154(b) by 60 days.

(21) Appl. No.: 13/262,557

(22) PCT Filed: Apr. 1, 2010

(86) PCT No.: PCT/EP2010/054421
§ 371 (c)(1),
(2), (4) Date: Nov. 23, 2011

(87) PCT Pub. No.: WO2010/112586
PCT Pub. Date: Oct. 7, 2010

(65) Prior Publication Data
US 2012/0068818 A1    Mar. 22, 2012

(30) Foreign Application Priority Data

Apr. 3, 2009 (EP) .................................... 09157266

(51) Int. Cl.
G05B 19/00 (2006.01)
G07C 9/00 (2006.01)
H04W 12/08 (2009.01)

(52) U.S. Cl.
CPC ........ G07C 9/00007 (2013.01); H04W 12/08 (2013.01); *G07C 9/00119* (2013.01); *G07C 2209/62* (2013.01)

(58) Field of Classification Search
CPC ............ G07C 9/00007; G07C 9/00119; G07C 2209/62; H04W 12/08
USPC ..... 230/382, 382.5; 340/5.6, 5.61–5.67, 5.7; 187/391
See application file for complete search history.

(56) References Cited

U.S. PATENT DOCUMENTS

| 4,655,324 A | * | 4/1987 | Meguerdichian et al. ... 187/380 |
| 7,377,426 B1 | | 5/2008 | Makeever |
| 8,093,988 B2 | * | 1/2012 | Takene et al. .................. 340/5.7 |
| 8,195,182 B2 | * | 6/2012 | Fink ........................ H04L 63/10 455/411 |
| 8,342,407 B2 | * | 1/2013 | Williams et al. ......... 235/462.13 |
| 2002/0180582 A1 | * | 12/2002 | Nielsen ........................... 340/5.6 |
| 2003/0132282 A1 | * | 7/2003 | Workens ........................ 235/379 |
| 2003/0163709 A1 | * | 8/2003 | Milgramm et al. .......... 713/186 |

(Continued)

FOREIGN PATENT DOCUMENTS

| EP | 1705595 | 9/2006 |
| FR | 2873217 | 1/2006 |

(Continued)

OTHER PUBLICATIONS

PCT International Search Report from PCT/EP2010/054421, dated Jul. 21, 2010.

(Continued)

*Primary Examiner* — Yong Hang Jiang
(74) *Attorney, Agent, or Firm* — Baker & Hostetler LLP

(57) ABSTRACT

An access control method can include sending an identification code to an access node using a mobile telephone. If the identification code is recognized as valid, an access code is sent from the access node to the mobile telephone and presented on the display of the mobile telephone. The access code is detected using a camera, and if the access code is recognized as valid, the access is granted.

36 Claims, 3 Drawing Sheets

(56) References Cited

U.S. PATENT DOCUMENTS

| | | | | |
|---|---|---|---|---|
| 2004/0147244 A1* | 7/2004 | Raisanen | ................ | 455/404.2 |
| 2005/0040951 A1* | 2/2005 | Zalewski | ................ | G06Q 10/02 |
| | | | | 340/572.1 |
| 2005/0125301 A1* | 6/2005 | Muni | ................ | 705/23 |
| 2006/0100779 A1* | 5/2006 | Vergin | ................ | 701/211 |
| 2006/0126906 A1* | 6/2006 | Sato et al. | ................ | 382/118 |
| 2006/0171521 A1* | 8/2006 | Allen et al. | ................ | 379/219 |
| 2006/0293929 A1* | 12/2006 | Wu et al. | ................ | 705/5 |
| 2007/0025315 A1* | 2/2007 | Gerstenkorn | ................ | 370/342 |
| 2007/0261924 A1* | 11/2007 | Lindberg et al. | ................ | 187/391 |
| 2008/0108324 A1* | 5/2008 | Moshir | ................ | G06F 21/35 |
| | | | | 455/411 |
| 2008/0263652 A1* | 10/2008 | McMurtry | ................ | G06F 21/335 |
| | | | | 726/9 |
| 2009/0014254 A1* | 1/2009 | Finschi | ................ | B66B 1/468 |
| | | | | 187/381 |
| 2009/0150889 A1* | 6/2009 | Yamaguchi et al. | ................ | 718/102 |
| 2010/0020970 A1* | 1/2010 | Liu et al. | ................ | 380/255 |
| 2010/0219234 A1* | 9/2010 | Forbes | ................ | 235/375 |
| 2010/0299731 A1* | 11/2010 | Atkinson | ................ | G06F 21/42 |
| | | | | 726/6 |
| 2011/0151903 A1* | 6/2011 | Moshir et al. | ................ | 455/466 |
| 2011/0291798 A1* | 12/2011 | Schibuk | ................ | G07B 15/00 |
| | | | | 340/5.61 |
| 2012/0233669 A1* | 9/2012 | Husemann et al. | ................ | 726/4 |
| 2012/0298737 A1* | 11/2012 | Thakar et al. | ................ | 235/375 |
| 2013/0048435 A1* | 2/2013 | Finschi | ................ | 187/381 |

FOREIGN PATENT DOCUMENTS

| | | |
|---|---|---|
| JP | 2005-280882 A | 10/2005 |
| WO | 01/41081 | 6/2001 |
| WO | 2006000618 | 1/2006 |
| WO | 2010/112586 A1 | 10/2010 |

OTHER PUBLICATIONS

International Preliminary Report on Patentability from PCT/EP2010/054421, dated Oct. 27, 2011.

* cited by examiner

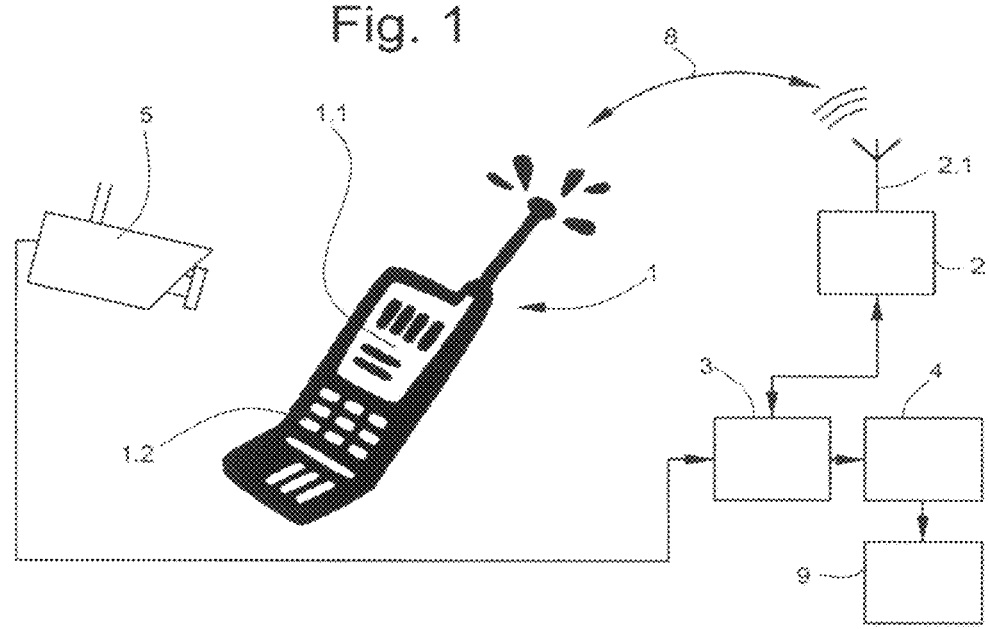
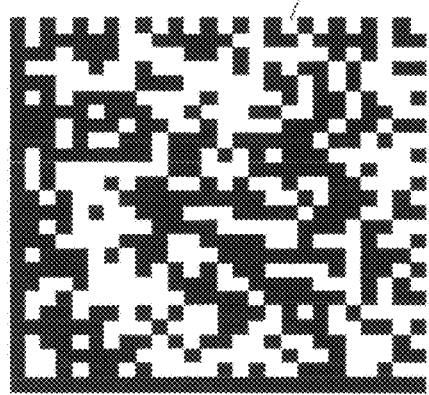
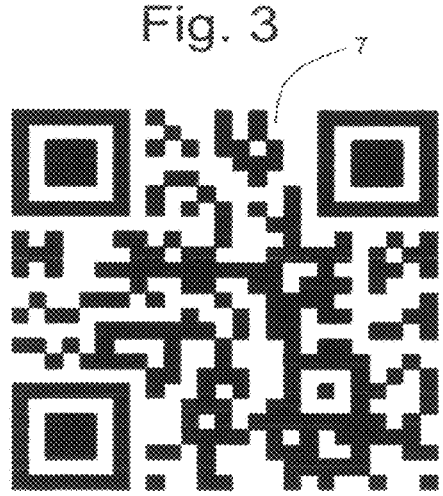

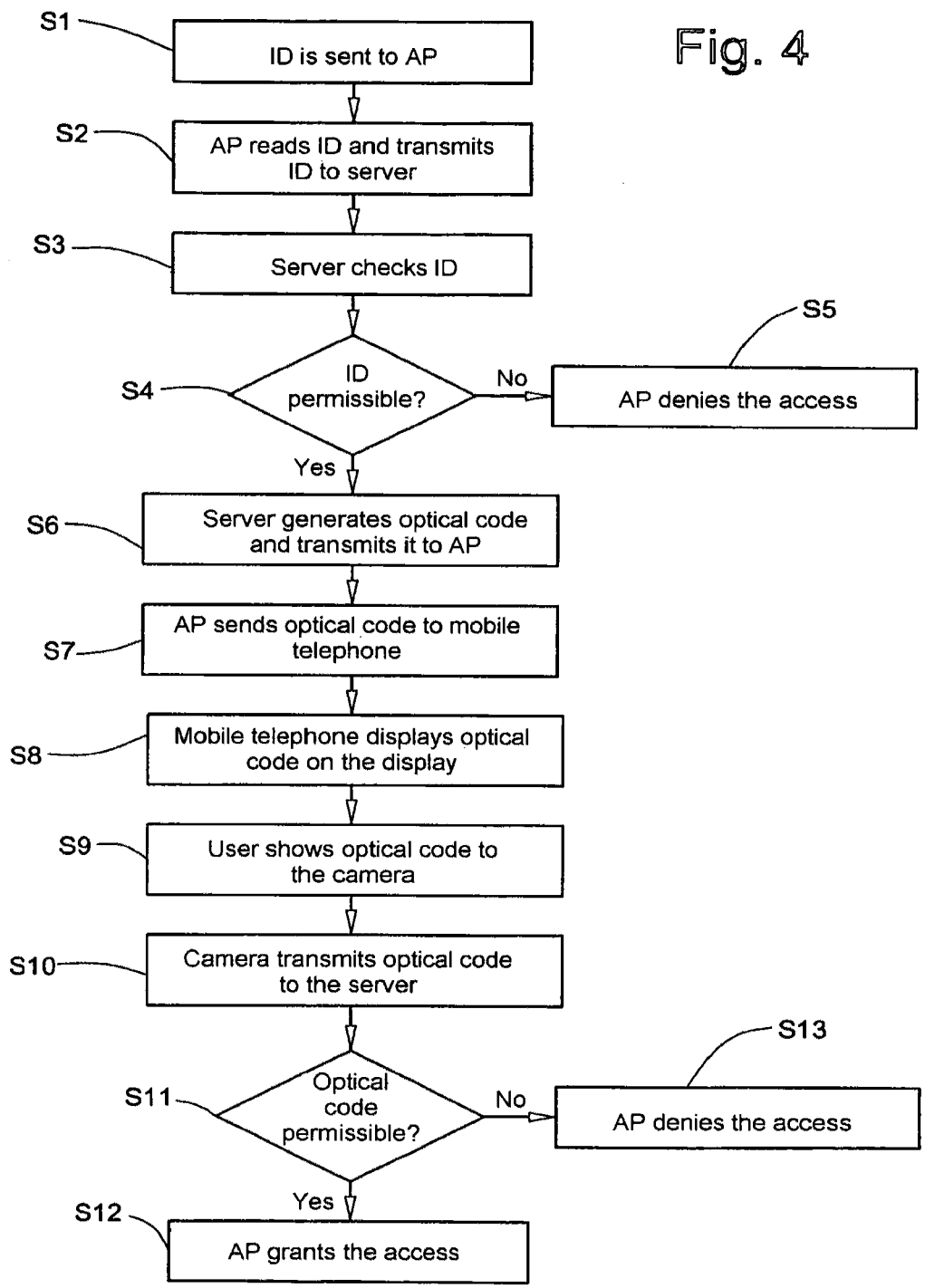

ACCESS CONTROL SYSTEM

FIELD

The disclosure relates to a method and to a device for access control, for example, for buildings and elevator systems.

BACKGROUND

From document WO 2006/000618 A2, a method for the wireless input of a destination call for an elevator is known. In this context, a wireless connection is set up between the mobile telephone of the person who has requested an elevator cage with the mobile telephone and the elevator controller in a first step. In a second step, the person and the floor on which the person is located are identified by the elevator controller and the user profile belonging to this person is selected. Subsequently, the elevator controller determines the destination floor by means of the user profile and ensures that an elevator cage is provided for the person on the floor on which he is located, and the destination floor is approached thereafter.

From document JP 2005-280882, an elevator with a safety system is known in which a mobile telephone is used for the identification of a person. So that the person obtains access to the elevator, the identification number indicated on the display panel of the mobile telephone is acquired by means of an optical reader and forwarded to an identification unit. If the identification number, and thus the person, is registered with the identification unit, this person is granted access to the elevator.

SUMMARY

At least some embodiments comprise a method and a device for access control to a building, a building area, a room, an elevator cage or an elevator.

In some embodiments, a method for access control comprises the following steps. An identification code is sent to an access node by means of a mobile telephone. If the identification code is recognized as being valid, an access code is sent to the mobile telephone by the access node and presented on the display of the mobile telephone. The access code is detected by means of a camera and if the access code is recognized as being valid, the access is granted.

In one embodiment of the method, the identification code is the telephone number of the mobile telephone.

In a further embodiment of the method, the access code is a two-dimensional optical code.

In a third embodiment of the method, the access code is a data matrix code or a QR code.

In addition, the identification code can be provided to a control unit by the access node, which then checks whether the identification code is contained in a list of permissible identification codes. If this is the case, the access code is conducted to the access node.

In addition, an elevator can be released for use when the access has been granted.

In a further embodiment, the access code is valid for a limited time. This further reduces the risk of misuse.

In another embodiment, the access code can be used only once. This can further reduce the risk of misuse.

Particular embodiments can be used for the purpose of access control to a building, a building area, an elevator cage or an elevator.

A device for performing the method for access control can comprise a mobile telephone and an access node, which is constructed and can be operated in such a manner that it can receive the identification code of the mobile telephone and transmit the access code to the mobile telephone. The device can also comprise a control unit, which is constructed and can be operated in such a manner that it can check the identification code and generate the access code. Furthermore, an optical reader is provided, which is connected to the control unit.

The optical reader can be a scanner or a camera.

A computer program product is stored on a medium, which can be used by a computer, and which contains program code readable by the computer and can cause that the computer performs the described method for access control. The computer can be a part of the control unit or of the access node.

BRIEF DESCRIPTION OF THE DRAWINGS

In the text which follows, the disclosed technologies will be explained in greater detail by means of a number of exemplary embodiments, with reference to four figures.

FIG. 1 shows a possible embodiment of a device for access control in the form of a block diagram.

FIG. 2 shows an example of a data matrix code.

FIG. 3 shows an example of a QR code.

FIG. 4 shows a flowchart for illustrating a method for access control.

DETAILED DESCRIPTION

Figure 5:
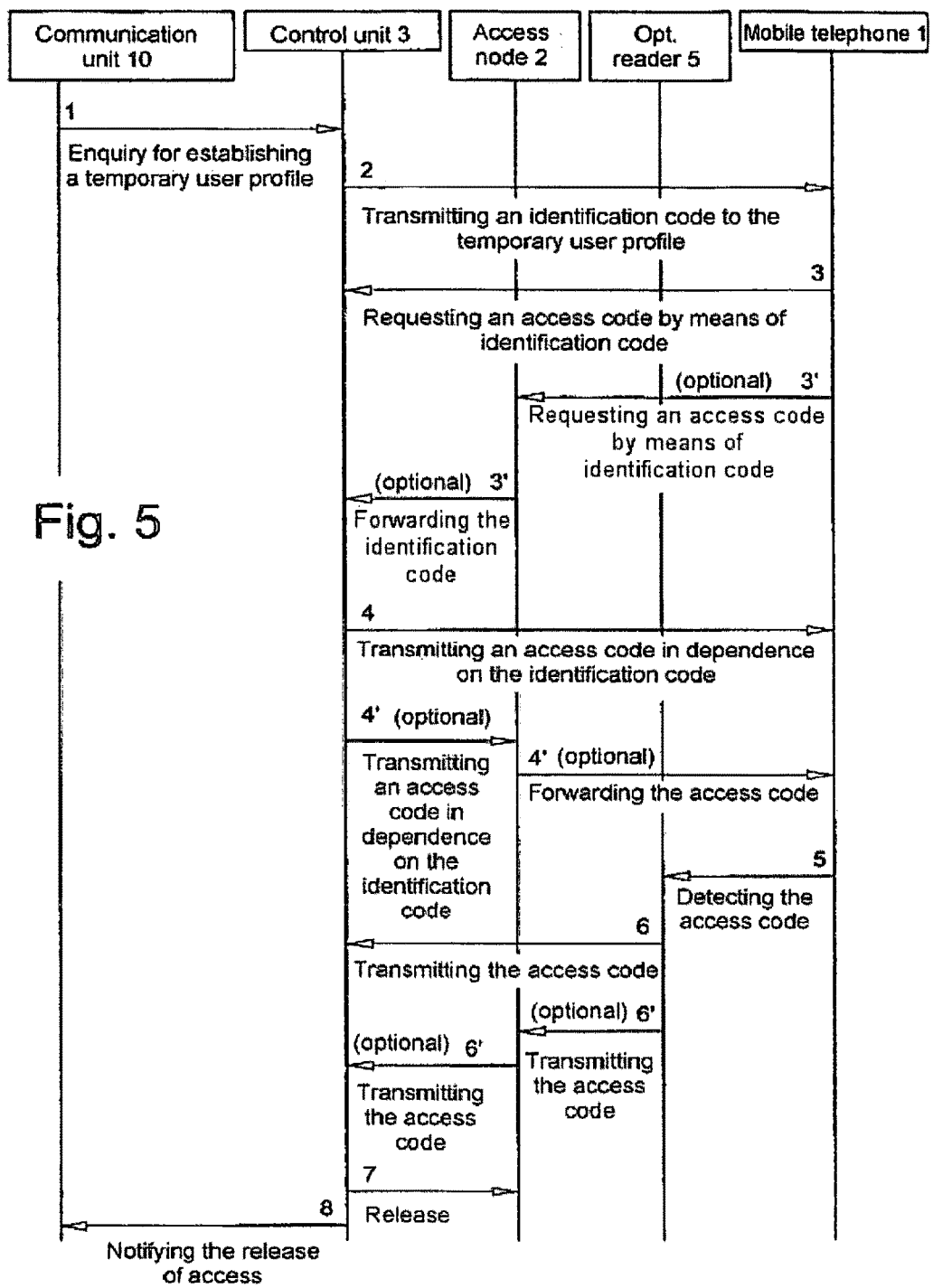
FIG. 5 shows a further example of a method for access control.

In the text which follows, exemplary embodiments are explained with reference to FIGS. 1 and 4. In FIG. 1, a possible embodiment of the device for access control is shown in the form of a block diagram. FIG. 4 shows the flowchart for illustrating an embodiment of the method for access control.

For a person to obtain entry or access to a building, a building area such as, for example, a room, or an elevator 9, the person can identify himself at a corresponding access node 2, which will also be called access point AP in the text which follows, by means of their mobile telephone 1. As soon as the person comes within range of the access node 2 with their mobile telephone 1, an identification code ID is sent by the mobile telephone 1 to the access node 2 via a radio link 8 (step S1).

The radio link 8 can be effected, for example, via Bluetooth. Bluetooth is a standard according to IEEE 802.15.1 and is used for the cableless networking of devices over a short distance. In this context, Bluetooth forms the interface via which the mobile telephone 1 and the access node 2 can communicate with one another.

The access node 2 is equipped with a corresponding antenna 2.1 for this purpose. After the access node 2 has received the identification code ID, it forwards it to a control unit 3 (step S2). The control unit 3 can be, for example, a server. The access node 2 and the control unit 3 are arranged spatially separated, as a rule. This is not mandatory. In a building, a number of access nodes 2 can also be located, all of which are then connected to the control unit 3.

The identification code ID can be the telephone number of the mobile telephone 1. However, it can also be provided that the person who uses the mobile telephone 1 must enter a particular code, for example a password, via the keyboard 1.2 of the mobile telephone 1, which is then transmitted to the access node 2 via the radio link 8. In this case, the code entered via the keyboard 1.2 corresponds to the identification code ID.

In a further step S3, the server 3 checks the received identification code ID. If the identification code ID is not considered to be permissible (step S4), the server 3 informs the access node 2 that the person is denied the access to a particular equipment, such as, for example, an elevator 9 (step S5). If, on the other hand, the identification code ID is considered to be permissible (step S4), the server 3 generates an access code (step S6) and transmits it to the access node 2. The access code will also be called optical code in the text which follows.

The access code can be valid for a limited time. The result is that a person is granted access only for a certain period of time. In addition, it can be provided that the access code is valid only a single time so that, after it has been used once, it can no longer be used a further time. This can prevent misuse. Thus, the mobile telephone 1 cannot be used by any other person for obtaining access with the same access code.

Furthermore, the following can be provided. As soon as the person who carries the mobile telephone 1 has been granted access, any further access with the same mobile telephone 1 is blocked for a certain period of time and/or for a certain access node. This can prevent a case where the mobile telephone 1 is handed to another person, who then obtains access with this mobile telephone.

As the access code, a data matrix code 6 can be generated, for example, by the server 3. FIG. 2 shows an example of such a data matrix code 6. In this context, the term code does not mean the encryption of data in order to keep these secret but the graphical imaging of the data in binary symbols. The data matrix code is a two-dimensional barcode or 2D code which exists in various code schemes, for example "ECC n". ECC stands for error checking and correction algorithm and the following n stands for a value between 0 and 200. The most reliably readable code scheme is the ECC 200 scheme. The size of the square or also rectangular code image is determined from a large selected set, the symbol elements of the code image are square or round. The data matrix code is standardized at the International Standardization Organization (ISO) and described in ISO specifications ISO/IEC 16022:2000 and ISO/IEC 24720:2006 and in other standards for applications such as, for example, in DIN standards and DIN-EN standards. These standards are binding throughout the industry. Using a standardized code can ensure that the code can be read independently of the manufacturer of the coder or of the reader.

In the data matrix code 6, the information is coded in a square or rectangular area as patterns of equally large dots. The dots are small black or white boxes which adjoin one another, or round dots with gaps in between. Due to the uniform symbol size and the fixed symbol spacing, reading of the image and decoding the information is reliable and the data matrix code is compact in its two-dimensional extent. During the reading of the data matrix code, the arrangement of dots within the border and in the raster of the matrix is detected.

The data matrix code 6 can contain redundant data so that, for example, up to 25% errors in the code image can be corrected with a Reed-Solomon error correction in ECC 200. This can be useful when parts of the code image are covered or unreadable.

In further embodiments, a QR code 7 can also be generated, for example, as access code by the server 3. FIG. 3 shows an example of such a QR code 7. The QR code 7 is also a two-dimensional barcode or 2D code, QR standing for Quick Response.

In the QR code 7, too, the term code does not mean the secret encryption of data but the imaging of the data in binary symbols. The QR code 7 consists of a square matrix of black and white dots which represent the coded data in the binary system. A special marking in three of the four corners of the square specifies the orientation. In the QR code, the data are present redundantly so that, even if up to 30% of the QR code are destroyed, it can still be read correctly. In various embodiments, up to 7,089 numeric characters, 4,296 alphanumeric characters or 2,953 bytes can be stored with the QR code 7. The standard for the QR code is found in ISO standard ISO/IEC18004.

Both the data matrix code 6 and the QR code 7 are machine-read by means of an optical reader 5 such as, for example, a scanner or a camera. The data contained in codes 6 and 7 can then be processed further electronically.

After the server 3 has generated the access code 6 or 7 and transmitted it to the access node 2, the access code 6 or 7 is sent to the mobile telephone 1 by the access node 2 via the radio link 8 in a step S7.

Following this, the access code 6 or 7 is presented on the display 1.1 of the mobile telephone 1 in step S8. The user of the mobile telephone 1 can now show this access code to a camera 5 which sends the recorded image with the access code to the server 3 (step S10). The server 3 thereupon checks whether the access code is permissible (step S11). This can be effected, for example, in that the server 3 compares the access code recorded by the camera 5 with the access code sent by the server to the mobile telephone 1. If the access code is considered to be permissible (step S11), the server 3 informs the access node 2 that access is granted to the person (step S12). If, in contrast, the access code is not considered to be permissible (step S11), the access node 2 is informed by the server 3 that the access or the use of a particular item of equipment such as, for example, an elevator 9, is denied to the person (step S13). If the access to the elevator 9 is denied, the elevator controller 4 which is used for controlling the elevator 9 is informed of this by the control unit 3. The elevator controller 4 thereupon initiates the corresponding measures.

In the present context, the term access is understood to be a generic term which comprises both the entry or access to a building, a room or an elevator cage and the use of a device or equipment such as, for example, an elevator.

FIG. 5 shows a sequence scheme of a further example of a method according to FIGS. 1 to 4 for access control.

Buildings are secured more and more by electronic access controls. Occupants of the building or assistants who are active in this building are then also visited by persons who do not have access authorization for the building. So that access can be granted to these persons in a simple and efficient manner, the method for access control according to FIGS. 1 to 4 can be applied.

In a step 1, an occupant of the building or an assistant who is active in this building places an enquiry to a control unit 3 for a visitor without access authorization to the building, for setting up or generating a user profile for the visitor by means of a communication unit 10, for example a computer, a PDA, a mobile telephone etc.

The enquiry can contain at least one rule, for example generated by means of a web application, a suitable computer program, a functionality of a date agreement or administration application etc., and sent to the control unit 3. A date agreement or administration application represents, for example, Lotus Notes, Microsoft Outlook etc.

The control unit 3 generates in a second step the user profile in dependence on at least one rule and sends an identification code for the user profile to a mobile telephone 1 of the visitor.

The at least one rule can be of any type. It is specified by the communication unit 10 and/or by the control unit 3. It is conceivable that the at least one rule consists in that no rule is used. It can also depend on safety requirements, needs of the visitor, for example access suitable for handicapped persons, etc., needs of the person visited etc. For example, a time window in which the access is granted so that the access is only temporarily valid can be defined as at least one rule. As well, at least one rule could be that, before an access release is granted, it is checked whether the visitor is located in front of the building. A further rule could be that the visitor, when entering the building, is monitored or tracked by means of suitable monitoring systems along the way to the location of the visited person. If the visitor is enabled to have access to the building more than once, the access times can be determined by means of the at least one rule. For example, it could be regulated that the visitor should only have access on Friday from 14.00-17.00 in each case.

As has already been described in FIGS. 1 to 4, the identification code can be sent to the mobile telephone 1 from the control unit 3 in different manners. For example, it can be contained in a short message, an email, an audio or voice message etc. and comprise, for example, a password, tones, tone sequences, voice, a sequence of letters, a link etc.

The user profile can contain at least one indication which allows the visitor to be authenticated. However, it is also conceivable that the user profile only contains the at least one rule and an option for verifying the identification code.

In a third step, the mobile telephone 1 sends the identification code for requesting an access code to the control unit 3. Optionally, the identification code can be sent by the mobile telephone 1 to the control unit 3 via an access node 2, according to step 3'. This alternative is already described in FIGS. 1 to 4. This can mean that it can be determined at the same time whether the visitor is located in the access area of the building.

According to step 4, the control unit 3 checks the identification code obtained from the mobile telephone 1 and compares this code with the user profile and the verification options contained therein and/or authentication data of the visitor. For example, the identification code originally sent to the mobile telephone 1, the telephone number, the name, a random value etc. can be used as verification options or authentication data. For example, hash values could be calculated by means of a suitable algorithm from the original identification code and that last sent, and compared by the control unit 3. If the comparison of the identification code sent last with the user profile or with data deposited or stored in the user profile results in a valid value, the control unit 3 generates and sends to the mobile telephone 1 an access code, for example a sequence of numbers, a two-dimensional code, a QR code, a data matrix code, a barcode, an image etc.

As an alternative, in accordance with step 4', the access code can also be transmitted by the control unit 3 to the mobile telephone 1 via the access node 2.

The access code, which can be presented on an output device, for example a display, of the mobile telephone is detected by an optical reader 5, according to a fifth step, and sent to the control unit 3 either via the access node 2 according to step 6' or directly according to step 6.

The control unit 3 checks in dependence on the at least one rule in the user profile and/or the user profile, according to step 7, whether the access code is valid or permissible. If the access code is valid, a release of the access is sent to the access node 2 by the control unit 3 and the access to the building is thus granted to the visitor.

If the user profile contains the at least one rule, that the visited person is to be notified, the control unit 3 sends to the communication unit 10 a notification, for example a short message, an email, a voice message etc., according to step 8, so that the visited person is informed about the arrival of the visitor.

In further embodiments, for example, a scanner can also be used instead of a camera in order to detect the access code 6 or 7 on the display 1.1 of the mobile telephone 1.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

The invention claimed is:

1. An elevator access control method for granting access to a user, comprising:
   receiving, at an access node located in an access area of a building for which access is to be granted, and prior to receiving a user request for access, an identification code from a mobile telephone within range of the access node of the building;
   determining if the identification code is valid for granting access to the building;
   based on the determining that the identification code is not valid for granting access to the building, denying access to an elevator at the building;
   based on the determining that the identification code is valid for granting access to the building, generating an access code to be used to access predetermined equipment in the building and transmitting the access code by the access node to the mobile telephone for displaying the access code on a screen of the mobile telephone, without any further user request;
   reading the access code displayed on the screen of the mobile telephone after validation of the identification code, while the mobile telephone is located in the access area of the building, the reading of the access code being carried out by a reader located in the access area of the building; and
   based on the reading of the access code, granting access to the predetermined equipment including the elevator at the building.

2. The elevator access control method of claim 1, further comprising granting access to the building based on the reading of the access code.

3. The elevator access control method of claim 1, wherein the identification code comprises a telephone number of the mobile telephone.

4. The elevator access control method of claim 1, wherein the access code is usable once.

5. The elevator access control method of claim 1, wherein the access code is valid for a limited time.

6. The elevator access control method of claim 1, the method further comprising notifying a visited person at the building that the user has arrived at the building.

7. The elevator access control method of claim 1, the method further comprising receiving an order from an occupant of the building to set up a user profile for the user.

8. The elevator access control method of claim 7, further comprising sending the identification code to the mobile telephone based on the user profile.

9. The elevator access control method of claim 1, further comprising sending the identification code to the mobile telephone.

10. An elevator system component comprising:
a computer; and
a computer-usable medium, the computer-usable medium containing code that, when executed by the computer, causes the computer to,
receive, at an access node located in an access area of a building for which access is to be granted, and prior to receiving a user request for access, an identification code from a mobile telephone within range of the access node of the building,
determine if the identification code is valid for granting access to the building,
as a result of the determining that the identification code is not valid for granting access to the building, denying the visitor access to an elevator at the building;
based on the determining that the identification code is valid for granting access to the building, generate an access code to be used to access predetermined equipment in the building and transmit the access code by the access node to the mobile telephone for displaying the access code on a screen of the mobile telephone, without any further user request,
read the access code displayed on the screen of the mobile telephone after validation of the identification code, while the mobile telephone is located in the access area of the building, the reading of the access code being carried out by a reader located in the access area of the building, and
based on the reading of the access code, grant access to the predetermined equipment including the elevator.

11. An elevator installation comprising:
an elevator;
an access node for the elevator, the access node located in an access area of a building;
a control unit coupled to and separate from the access node; and
an elevator controller coupled to the control unit and to the elevator, the control unit being configured to,
receive at the access node an identification code from a mobile telephone which comes within range of the access node prior to receiving a user request for access from the mobile telephone,
determine if the identification code is valid for granting access to the elevator,
based on the determining that the identification code is not valid for granting access to the elevator, deny access to the elevator,
based on the determining that the identification code is valid for granting access to the elevator, generate an access code to be used to access predetermined equipment in the building and transmit the access code by the access node to the mobile telephone for displaying the access code on a screen of the mobile telephone, without any further user request,
read the access code displayed on the screen of the mobile telephone after validation of the identification code, while the mobile telephone is located in the access area of the building, the reading of the access code being carried out by a reader located in the access area of the building, and
based on the reading of the access code, cause the elevator controller to grant access to the predetermined equipment including the elevator.

12. The elevator installation of claim 11, wherein the access code comprises a two-dimensional optical code.

13. A non-transitory computer-usable medium containing code that, when executed by a computer, causes the computer to perform a method, the method comprising:
receiving, at an access node located in an access area of a building for which access is to be granted, and prior to receiving a user request for access, an identification code from a mobile telephone within range of the access node of the building;
determining if the identification code is valid for granting access to the building;
based on the determining that the identification code is not valid for granting access to the building, denying access to an elevator at the building,
based on the determining that the identification code is valid for granting access to the building, generating an access code to be used to access predetermined equipment in the building and transmitting the access code by the access node to the mobile telephone for displaying the access code on a screen of the mobile telephone, without any further user request;
reading the access code displayed on the screen of the mobile telephone after validation of the identification code, while the mobile telephone is located in an access area of the building, the reading of the access code being carried out by a reader located in the access area of the building; and
based on the reading of the access code, granting access to the predetermined equipment including the elevator.

14. The non-transitory computer-usable medium of claim 13, wherein the access code comprises a QR code.

15. An elevator access method comprising:
receiving a request from a building occupant or assistant to generate a user profile for a visitor to a building;
generating the user profile;
sending at an access node located in an access area of the building, to a mobile telephone of the visitor which comes within range of the access node, an identification code for the user profile;
receiving at the access node of the building, from the mobile telephone, a request for an access code based on the identification code;
if the identification code is invalid for granting access to the building, denying the visitor access to an elevator at the building;
if the identification code is valid for granting access to the building, generating a machine-readable two-dimensional optical code to be used to access predetermined equipment in the building, and sending by the access node an access code to the mobile telephone, without any further user request, the access code comprising the two-dimensional optical code;
reading the two-dimensional optical code from a display of the mobile telephone while the mobile telephone is located in the access area of the building, the reading of the two-dimensional optical code being carried out by a reader located in the access area of the building;
determining that the optical code is valid;
granting to the visitor access to the predetermined equipment including the elevator at the building; and
informing a visited person at the building that the visitor is at the building.

16. The elevator access method of claim 15, wherein a hyperlink is used to send the identification code to the mobile telephone of the user.

17. The elevator access method of claim 15, the method further comprising tracking the visitor as the visitor travels to a location of the visited person in the building.

18. The elevator access method of claim 15, the user profile being generated according to one or more rules.

19. The elevator access method of claim 18, the one or more rules comprising a rule that indicates one or more requirements associated with the visitor.

20. The elevator access method of claim 18, the one or more rules comprising a rule that indicates one or more requirements associated with the visited person.

21. The elevator access control method of claim 7, wherein the user profile is generated according to one or more rules.

22. The elevator access method of claim 21, the one or more rules comprising a rule that indicates one or more requirements associated with the user.

23. The elevator access method of claim 21, the one or more rules comprising a rule that indicates one or more requirements associated with a visited person.

24. The elevator access method of claim 21, the one or more rules comprising tracking the user as the user travels to a location of a visited person in the building.

25. An elevator access control method, comprising:
receiving, at an access node of a building for which access is to be granted, and prior to receiving a user request for access, an identification code from a mobile telephone of a visitor of the building within range of an access node of the building;
transmitting by the access node the identification code to a server;
determining by the server if the identification code is valid for granting access to at least one of a predetermined building area or an elevator of the building;
based on the determining that the identification code is not valid for granting access to the building, denying access to the predetermined building area or the elevator at the building for the visitor at the building;
based on the determining that the identification code is valid for granting access to the predetermined building area or the elevator at the building, generating an access code to be used to access predetermined equipment in the building and transmitting the access code by the access node to the mobile telephone of the visitor at the building for displaying the access code on a screen of the mobile telephone, without any further user request;
reading the access code displayed on the screen of the mobile telephone after validation of the identification code while the mobile telephone is located in an access area of the building, the reading of the access code being carried out by a reader located in the access area of the building; and
based on the reading of the access code and predetermined access conditions, granting to the visitor access to the predetermined equipment or the elevator at the building.

26. The elevator access control method of claim 25, further comprising granting to the visitor access to the building based on the reading of the access code.

27. The elevator access control method of claim 25, the identification code comprising a telephone number of the mobile telephone.

28. The elevator access control method of claim 25, the access code being usable once.

29. The elevator access control method of claim 25, the access code being valid for a limited time.

30. The elevator access control method of claim 25, the method further comprising notifying a visited person at the building that the visitor has arrived at the building.

31. The elevator access control method of claim 25, the method further comprising receiving an order from an occupant of the building to set up a user profile for the visitor comprising additional predetermined conditions.

32. The elevator access control method of claim 31, further comprising sending the identification code to the mobile telephone based on the user profile of the visitor.

33. The elevator access control method of claim 25, further comprising sending the identification code to the mobile telephone.

34. The elevator access control method of claim 1, wherein said granting to the visitor access further comprises granting the visitor access to the predetermined equipment including the elevator at the building at an area of the building that is distinct from the area where the building is accessed by the visitor.

35. The elevator access control method of claim 1, wherein said granting to the visitor access further comprises granting the visitor access to the predetermined equipment including the elevator at the building within the area where the visitor enters the building.

36. The elevator installation of claim 11, wherein the control unit is further configured to:
in response to receiving an associated enquiry from a third party, generate a user profile for the visitor, the user profile comprising a rule;
send the identification code to the mobile telephone via a short message service message or an email message;
upon receiving the identification code from the mobile telephone through the access node, confirm that the received identification code conforms to the identification code sent to the mobile telephone;
determine in dependence on the rule in the user profile whether the access code displayed on the screen of the mobile telephone is valid;
send a release of access to the access node to granted to the visitor access to the predetermined equipment including the elevator if the access code is valid; and
send a notification to the third party of an arrival of the visitor.

* * * * *